United States Patent [19]

Fachini et al.

[11] Patent Number: 4,519,189

[45] Date of Patent: May 28, 1985

[54] TELESCOPING BASKET COVER

[75] Inventors: Robert M. Fachini, Naperville; Jesse H. Orsborn, Clarendon Hills; Monroe C. Barrett, Downers Grove, all of Ill.

[73] Assignee: J. I. Case Company, Racine, Wis.

[21] Appl. No.: 524,791

[22] Filed: Aug. 19, 1983

[51] Int. Cl.³ .................. A01D 87/10; A01D 46/08
[52] U.S. Cl. ............................ 56/16.6; 56/28; 56/30; 298/18; 414/486; 414/488; 414/501
[58] Field of Search ............. 56/16.6, 202, 344, 345, 56/346; 414/486, 488, 501, 471, 502, 525 R; 56/28, 30, 33, 36; 298/11, 18

[56] References Cited

U.S. PATENT DOCUMENTS

| 3,412,532 | 11/1968 | Nickla | 56/16.4 |
| 3,450,284 | 6/1969 | Diem | 414/501 |
| 3,813,861 | 6/1974 | Wood | 56/346 |
| 4,059,942 | 11/1977 | Timble et al. | 298/18 |

Primary Examiner—Gene Mancene
Assistant Examiner—David I. Tarnoff
Attorney, Agent, or Firm—Dressler, Goldsmith, Shore, Sutker & Milnamow, Ltd.

[57] ABSTRACT

A cotton harvester basket for accumulating picked cotton comprises four walls, a floor with a conveyor and a detachable roof section. The basket is vertically moveable between its raised and lowered positions by hydraulic cylinders disposed at the opposite ends of the basket. The same cylinders can be used for telescopically bringing the roof section into and out of the space encompassed by the basket walls.

5 Claims, 2 Drawing Figures

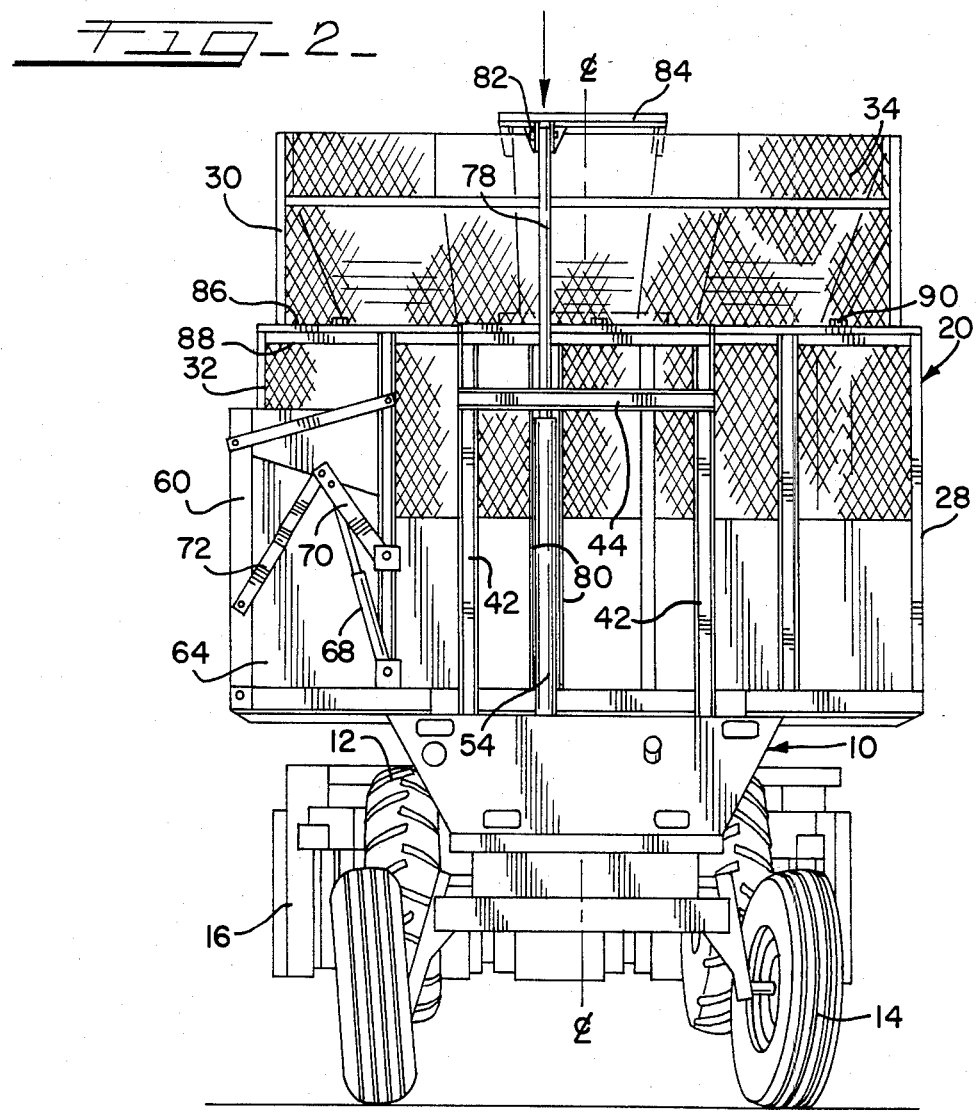

TELESCOPING BASKET COVER

BACKGROUND OF THE INVENTION

1. Field of the Invention

The invention relates to cotton harvesters and more particularly to a unique basket dismantling system.

2. Information Disclosure Statement

To summarize the problems associated with a commercially known cotton harvester basket structure and function, the typical baskets in use today are of the so-called "side-dump" type which create stability problems during unloading. These baskets have pivotal tops which add to the stability problem and which do not have the rigidity to accommodate optimum compaction of cotton therein.

The novel disassembleable basket permits a reduction of an overall height of a cotton harvester for many purposes, including transportation, long-term storage, and so forth.

SUMMARY OF THE INVENTION

The invention relates to a cotton harvester having a unique means for reducing height of the harvester by detaching a cover section from the basket and smoothly bringing it down into the space encompassed by the basket walls. A cotton accumulating basket has a door extending outwardly for a cotton discharge therethrough. A conveyor means facilitates a metering discharge of cotton in all basket height positions.

BRIEF DESCRIPTION OF THE DRAWINGS

FIG. 2 is a rear perspective view of the harvester of FIG. 1 showing the cotton basket being prepared for lowering its cover.

DESCRIPTION OF THE PREFERRED EMBODIMENT

Figure 1:
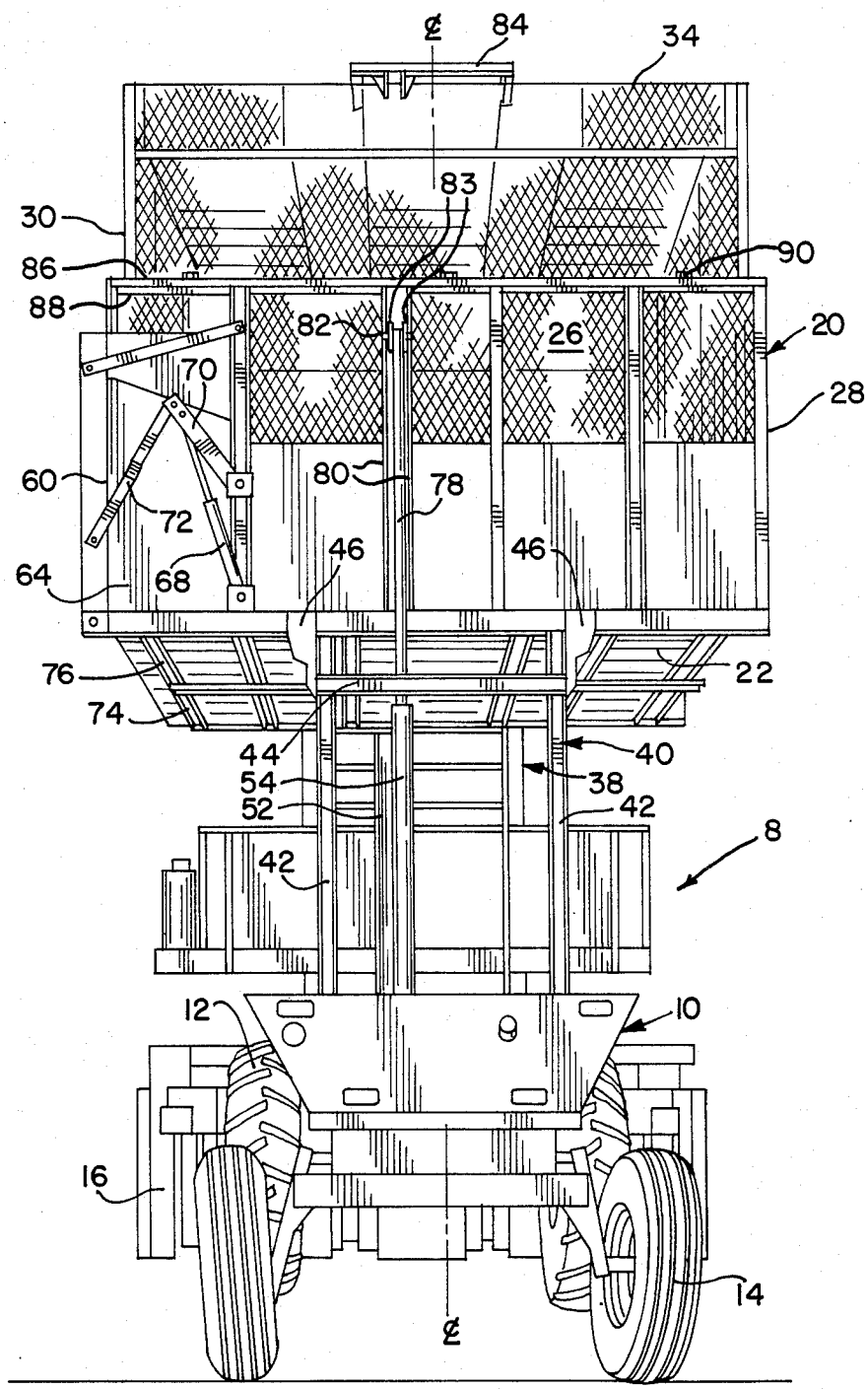
FIG. 1 is a rear perspective view of the improved cotton harvester basket in its raised position.

Referring now to the drawings wherein reference characters designate like or corresponding parts throughout the several views, there is shown in FIGS. 1 and 2 a cotton harvester 8 having a self-propelled chassis 10 supported on a pair of front drive wheels 12 and a pair of rear steerable wheels 14. The wheels of each pair are laterally spaced equidistantly from a fore-and-aft extending vertical plane disposed vertically of the harvester along the centerline as shown in FIG. 2. The harvester includes a plurality of cotton harvesting units 16 disposed along the front of the machine for harvesting rows of cotton as the harvester is driven through the field. The cotton is conveyed into a cotton receiving basket 20 when in the lowered position.

The basket 20 includes a floor 22, from which a rear wall 26, and a side wall 28 extend upwardly. Another side wall 30 extends between the front and the rear walls and includes a panel 32 pivotally mounted to swing outwardly. It will be noted that the panel 32 is spaced above the floor of the basket to define a crop discharge opening in the side of the basket. A roof structure 34 is secured to the top edges of the walls 26, 28 and 30 so as to define therewith a rigid unitary basket structure.

The basket 20 is mounted on the harvester by means of forward and rearward mast structures 38 and 40, respectively. Each of the mast structures includes interfitting frame sections secured to the chassis and the basket. More specifically, the frame section secured to the chassis consists of a pair of vertical channel members 42 interconnected by a horizontal cross brace 44. The frame section secured to the basket consists of a pair of vertical members 46. The vertical members 46 have rollers (not shown) riding in the channel members 42 of the chassis-mounted frame section so that the basket is constrained and guided for vertical movement relative to the chassis.

The basket 20 is vertically moveable by means of a pair of vertical hydraulic cylinders 52 and 54 disposed respectively at the front and rear of the basket adjacent to the respective mast structures 38 and 40. It will of course be understood that the cylinders 52 and 54 are supplied with hydraulic pressure fluid from a suitable hydraulic system in the harvester.

The basket 20 includes a door 60 pivotally mounted adjacent to the edge of the floor 22 and moveable between open and closed positions. Vertical side sheets 64 are secured at the opposite ends of the door 60 for purposes to be described. The door 60 is moved between its raised and lowered positions by hydraulic cylinders 68 mounted on the front and rear walls respectively of the basket. The cylinders 68 are each connected to a linkage including a lift arm 70 pivotally mounted on the respective end wall of the basket and another lift arm 72 pivotally connected between the arm 70 and the end of the door 60. The cylinders 68 are supplied in unison with hydraulic pressure fluid from the hydraulic system of the harvester and are actuated by the operator of the machine to raise and lower the door as required. The basket 20 is provided with an endless chain conveyor having chain and slat sections 74 and 76 which encircle the floor of the basket.

The hydraulic cylinders 52 and 54 have piston rods 78 releasably connected to the basket vertical flanges 80 by virtue of a pin 82 at 83. The same pin 82 locks the piston rod 78 to a roof bracket 84.

The roof structure has a peripheral horizontal frame 86 connectable with the upper horizontal frame 88 of the basket 20 by bolts 90 or other suitable mechanical means.

In operation cotton is harvested and conveyed into the basket in its lowered position. When it is desired to unload the basket into a waiting wagon or module builder, the basket lift cylinders 52 and 54 are extended and the basket is raised in a vertical path in a level attitude to the raised position shown in FIG. 1. The door 60 is lowered to a position which may be anywhere between horizontal and inclined upwardly depending on the fill up and height of the receiving wagon or module builder. The endless chain conveyor is then actuated to move the cotton laterally from the basket and across the door 60 into the receiving container. The side sheets 64 of the door 60 serve to guide the cotton as it moves along the door. The panel 32 is free to swing outwardly as the cotton is moved from the basket.

The side wall 30 blocks an outward movement of cotton, thereby pushing an upper portion of a cotton heap back toward the side wall 28. The cotton falls behind the floor adjacent portion moving through the discharge opening. Thus the side wall 30 forces the cotton discharge of only a selected section thereof.

The hydraulic cylinders 54 attachment to the basket is offset toward the door in order to more evenly accommodate a load shift by placing it within the range of a moving center of gravity of the basket with dischargeable cotton. The offset reduces a rotating moment caused by a load placement on a door and consequently diminishes a need for a counterbalancing structure.

The roof 34 is secured to the basket 20 during loading and discharge operations. In order to bring down the roof or cover 34, the bolts 90 are disassembled after the piston rods 78 are fastened to the brackets 84 at opposite ends of the basket by the pins 82, which previously locked the basket and piston rods. The cover then telescopically slides into the space encompassed by the basket side walls until the brackets 84 rest on the frame 88. Conversely, the cover will be raised by the cylinders which will be reattached thereafter to the basket for reciprocal movement thereof. The reduced basket height is advantageous for the cotton harvester transportation and reduces the overall dimensions of a storage facility.

While two embodiments of the invention have been illustrated and described herein, various changes and modifications may be made therein without departing from the spirit of the invention as defined by the scope of the appended claims.

What is claimed is:

1. In a cotton harvester having a wheeled chassis, a picking unit for harvesting cotton, and a unitary basket having a floor and upwardly extending wall for collecting cotton from said picking unit, said basket comprising:
    a disassembleable roof section releaseably secured to said basket walls;
    said roof section being uniformly adjacent to said basket walls;
    raising means moving said basket between lowered and raised positions;
    said raising means detachably secured to said roof section for telescopic movement of said section into and out of the space encompassed by said basket walls;
    said raising means moving said roof section either together with or separately from said basket walls in a path being perpendicular to said chassis.

2. In a cotton harvester having a wheeled chassis, a picking unit for harvesting cotton, and a unitary basket having a floor and upwardly extending wall for collecting cotton from said picking unit, said basket comprising:
    a disassembleable roof section releaseably secured to said basket walls;
    raising means moving said basket between lowered and raised positions;
    said raising means detachably secured to said roof section for telescopic movement of said section into and out of the space encompassed by said basket walls; and
    coupling means for alternate locking of said raising means with said basket walls and said roof section.

3. The invention according to claim 1, wherein said raising means comprise hydraulic cylinders disposed at opposite ends of said basket and evenly offset from a basket center plane toward a basket discharge opening.

4. The invention according to claim 3, and
    said roof section including brackets facilitating an attachment of said roof section to said raising means and limiting said roof section travel into said basket;
    said brackets have flange means for connecting said cylinders with said roof section;
    said flange means being evenly offset from a basket vertical center plane for matching with said cylinders.

5. In a cotton harvester having a wheeled chassis, a picking unit for harvesting cotton, and a unitary basket having a floor and upwardly extending walls for collecting cotton from said picking unit, said basket comprising:
    a disassembleable roof section releaseably secured to said basket walls;
    raising means moving said basket between lowered and raised positions;
    said raising means detachably connectable with said roof section for telescopically bringing said section into and out of the space encompassed by said bracket walls;
    coupling means for alternate locking of said raising means with said basket walls and said roof section;
    securing means immobilizingly and removeably connecting said roof section to said basket walls.

* * * * *